United States Patent Office 2,995,778
Patented Aug. 15, 1961

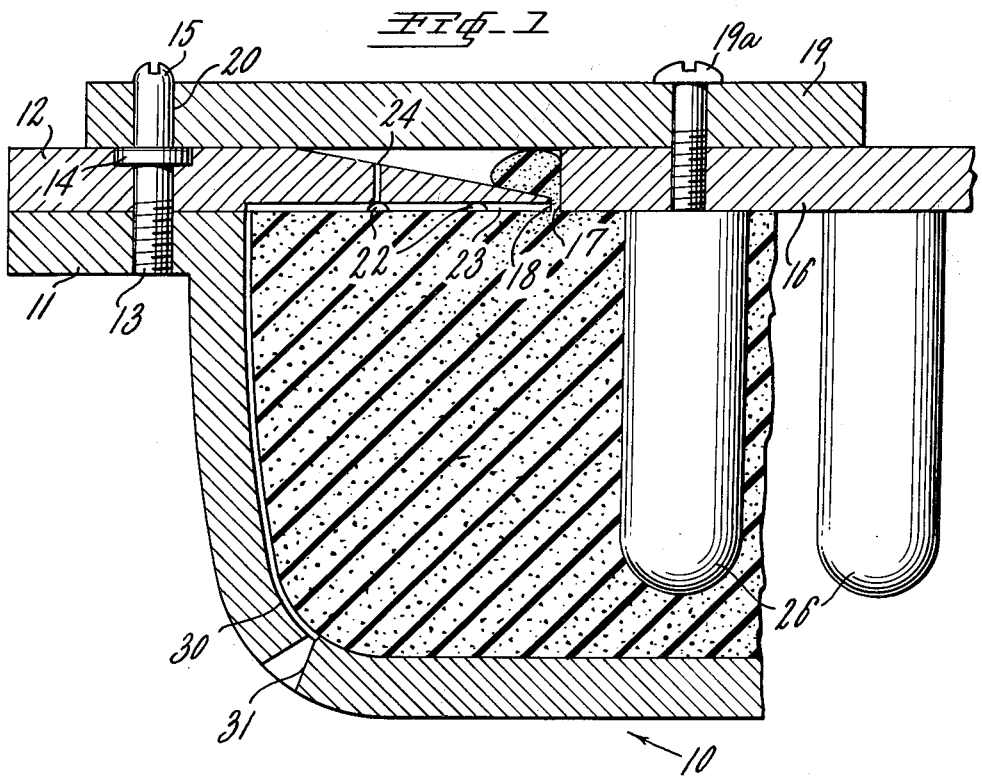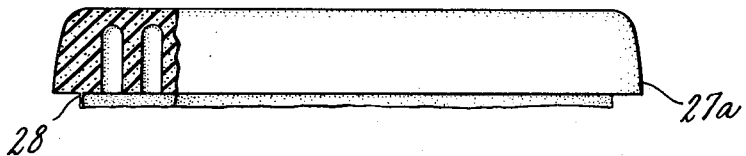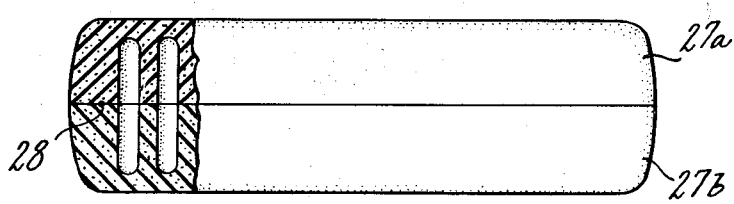

2,995,778
MOLD FOR FOAM RUBBER
Pedro A. Hill, Santa Ana, Calif., assignor to United
States Rubber Company, New York, N.Y., a corporation of New Jersey
Filed May 6, 1958, Ser. No. 733,355
1 Claim. (Cl. 18—39)

This invention relates to molded articles and to a mold for making such articles. In particular, the invention relates to foam rubber cushions having inner air cores and to a mold for making such cushions.

In the manufacture of molded articles of foam rubber or like materials, it has been the practice to pour the material into a mold and then press a cover over the open face thereof. Any excess material within the mold was permitted to escape in the form of a flash or overflow between the edges of the mold and the cover at the periphery of the molded article. The spacing between such edges was relatively narrow, and the result was a thin strip of material formed around the periphery of the molded article. This strip was removed by trimming or tearing.

This prior method has a substantial disadvantage when employed to produce individual portions of molded articles which are to be later assembled. For example, when cushions having inner air cores are produced from foam rubber, separate halves are molded and then cemented together with a rubber cement which forms a flexible joint. In such cases, even when great care is exercised in the trimming or tearing operation, the flash line at the perimeter of each molded half is rough and uneven. In some cases, the outer skin of the cushion is torn in removing the flash. When these halves are assembled, the joint line between them is likewise rough and unsightly in appearance. A joint so formed is also hard to the touch because excess cement remains at the rough joint and hardens.

It is an object of the invention to provide a new and improved foam rubber cushion having inner air cores.

It is another object of this invention to provide a new and improved mold for making molded articles in sections which will have a soft, smooth joint line after assembly of individual sections.

It is another object of my invention to provide a new and improved mold for making molded articles in sections whereby the trim or tear line does not affect the external joint line upon assembly.

These and other objects and advantages of my invention will become apparent upon consideration of the following detailed description of a preferred embodiment thereof, especially when taken in conjunction with the accompanying drawing, in which:

FIGURE 1 is a fragmentary view, in section, of a filled mold with the cover in place;

FIGURE 2 is a view, partly in section, to a reduced scale, of a cushion portion molded in accordance with my invention; and FIGURE 3 is a view, partly in section, to a reduced scale, of an assembled cushion made in accordance with my invention.

Referring now to FIG. 1 of the drawing, a mold 10 is provided with a peripheral flange 11 to which an overhanging annular lip 12 is secured by screws 13 (only one of which is apparent in the drawing) having shoulders 14 thereon. Screws 13 are threaded into the flange 11 and the lip 12 is clamped between the shoulders 14 and the flange 11.

The upper ends 15 of the screws 13 preferably are extended to provide locating pins to position a mold cover 16, and particularly, to position the outer periphery 17 of the cover 16, with respect to the inner periphery 18 of the overhanging lip 12. For that purpose, straps 19 (only one of which is apparent in the drawing) are secured to the plate 16 by screws 19a and the straps 19 are provided with bores 20 which receive the locating pins 15. Peripheral grooves 22 and cross grooves 23 preferably are formed in the bottom side of the overhanging lip 12. Air vents 24 extend through the lip 12 and are connected to the grooves 22, 23. Also, corner grooves 30 and corner vent holes 31 in the mold are utilized.

A suitable sealing material between contacting faces of the flange 11 and the lip 12 insures against seepage therebetween of the material to be molded. The lip 12 is tapered to allow material to overflow from the mold while maintaining a narrow tear line for removal of the flash.

A plurality of coring elements 26 are attached to the cover 16. As the cover is set in position, these elements 26 are pressed into the material in the cavity to form a pattern of cored openings which provide for a proper cushioning effect in the article being molded.

With the apparatus represented in FIGURE 1, it is clear that the material forced from the mold cavity will form a flash radially inward from the periphery of the molded article. This may be seen in FIGURE 2 wherein one half 27a of a cushion is represented after removal from the mold but prior to assembly to form a finished product. This cushion half 27a has its flash line at 28. The precise position of the flash line 28 is determined by the distance which lip 12 extends inwardly to overlie the mold cavity. Ordinarily, some of the flash tears off the cushion when the operator removes the cushion from the mold. This occurs because the overflow of material adheres to the cover 16 and the lip 12. After removal of the cushion half from the mold, the remaining flash may be torn or trimmed from the cushion half. Slight irregularities in the tear line do not detract from the finished cushion because the tear line is not at the periphery of the cushion. Assembly of a pair of cushion halves 27a, 27b molded by my improved method, provides a soft, even joint line entirely around the perimeter of the cushion since the skin surface is unbroken along the periphery of each half cushion.

From the foregoing description, it will be apparent that my invention provides an assembled, molded article which is superior in both appearance and texture to that presently available. A significant savings in manufacturing time is also provided since the need for precise and exacting care in removing the flash is eliminated. It is to be understood that the above-described embodiment is merely illustrative of my invention. Numerous variations and modifications may be devised by those skilled in the art without departing from the spirit and scope of the invention which is to be determined by the appended claim.

Having thus described my invention, what I claim and desire to protect by Letters Patent is:

In a mold for making mating halves of molded articles of foam rubber or the like, the improvement comprising an inwardly-directed radially-tapered peripheral member extending around the outer perimeter of the mold cavity, a mold cover for said cavity slightly smaller than the inner dimension of said member and means to support said cover, whereby excess moldable material overflows between said member and said cover to form a peripheral flash line on the mating surface spaced radially inwardly from the periphery of the finally-molded article.

References Cited in the file of this patent
UNITED STATES PATENTS

| | | |
|---|---|---|
| 2,324,974 | Greenup | July 20, 1943 |
| 2,358,962 | Cunningham | Sept. 26, 1944 |
| 2,734,227 | Costick | Feb. 14, 1956 |
| 2,802,766 | Leverenz | Aug. 13, 1957 |